No. 872,837. PATENTED DEC. 3, 1907.
J. MIO.
ADJUSTABLE BAKE PAN.
APPLICATION FILED JULY 23, 1907.
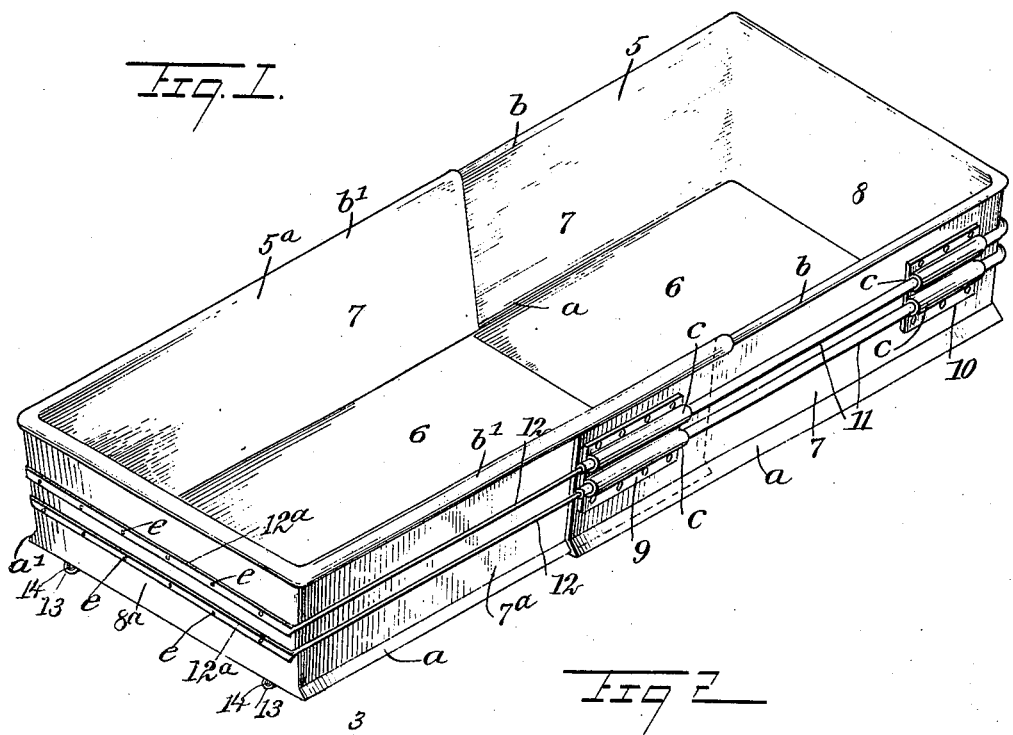
WITNESSES
INVENTOR
Jenmatsu Mio
BY
ATTORNEYS

UNITED STATES PATENT OFFICE.

JENMATSU MIO, OF SALT LAKE CITY, UTAH.

ADJUSTABLE BAKE-PAN.

No. 872,837.

Specification of Letters Patent.

Patented Dec. 3, 1907.

Application filed July 23, 1907. Serial No. 385,118.

*To all whom it may concern:*

Be it known that I, JENMATSU MIO, a subject of the Emperor of Japan, and a resident of Salt Lake City, in the county of Salt Lake and State of Utah, have invented a new and Improved Adjustable Bake-Pan, of which the following is a full, clear, and exact description.

The purpose of this invention is to provide novel details of construction for a bake pan to be used for baking bread, cakes or the like, which permit the pan to be adjusted longitudinally for changing its length, and thus adapt the pan to receive loaves of bread having different lengths; the pan being also available for baking or roasting meat or poultry of varying dimensions.

A further object is to strengthen the adjustable pan, so that it will not warp or become distorted from its proper shape when subjected to heat; and furthermore will be capable of withstanding hard usage in service.

The invention consists in the novel construction and combination of parts, as is hereinafter described, and defined in the appended claims.

Reference is to be had to the accompanying drawings forming a part of this specification in which similar characters of reference indicate corresponding parts in all the views.

Figure 1 is a perspective view of a bake pan having the improvements and shown fully extended; Fig. 2 is a side view of the improved pan, having its two sections slid together for reducing the length thereof; and Fig. 3 is an enlarged transverse sectional view of novel details, taken substantially on the line 3—3 of Fig. 2.

The improved bake pan is made of any suitable plate metal, and is given any preferred dimensions that will best conduce to its efficient service as a receptacle for food products that are to be subjected to heat in an oven.

The pan in its entirety embodies two preferably similar sections 5, 5ª, each section having a transverse wall at one end 8, and an opening at the opposite end. Specifically described, each section 5, 5ª of the bake pan, is preferably cut and shaped by suitable means, from a single piece of sheet metal of rectangular marginal form and having suitable dimensions.

By usual means the flat blank of sheet metal that is to become a half of the improved bake pan, is raised into box shape, having a bottom wall 6 that is marginally rectangular, two parallel side walls 7, 7, and an end wall 8, the structure being stiffened to resist heat and other strains, by the following provision.

It being understood that one section 5ª of the bake pan is to slide neatly within the other section, it will be obvious that said section is of a less width than the other one, and for the purpose of affording a telescoping engagement of the sections 5, 5ª, at their lower lateral corners, a preferably V-shaped channel *a* is formed at each of said corners on the section having greatest width, this affording two angular beads *a'* that project laterally at the bottom of the pan section 5 as shown in the drawings.

Upon the lower lateral corners of the other pan section 5ª, corresponding V-shaped ribs *a'* are formed, these ribs being fitted slidably into the channels in the corners on the other pan section.

It will be evident that the channels and ribs on the bottom edges of the pan sections 5, 5ª will render said corners quite rigid, and cause the bottom walls thereof to have close engagement with each other throughout their areas, which is very essential as it insures that the bottoms will not have an open crevice at the inner end of the pan section 5ª and cannot warp when subjected to heat.

The side walls 7, 7 of the pan sections 5, 5ª are preferably flared somewhat to give the pan conventional form, and the end walls 8 are similarly flared, this being essential for permitting material baked in the pan to be readily removed, as the shrinking of a baked loaf of bread will disengage the same from the pan and an inversion of the latter will discharge the loaf therefrom.

A tubular hem *b* is integrally formed on the upper edge of the section 5, and extends along the side walls 7, 7 a suitable distance. Upon the other pan section 5ª that slides in the section 5, similar tubular hems *b'* are formed, of a diameter to slidably fit upon the hems *b* and hold the upper edges of the pan sections in close contact, this being the case if one section is slid longitudinally on the other one.

Upon the outer section 5 of the bake pan, at each side wall 7 and adjacent to the free ends thereof, a bracket plate 9 is secured on each of said side walls, preferably about midway between the upper and lower edges thereof. The bracket plates 9 have two parallel tubular formations c, c, produced on each one, and a similar bracket plate 10 is secured on each side wall of the section 5 near the end wall 8 thereof. In the tubular formations c, c, of the bracket plates 9 and 10, on each side wall 7 of the pan section 5, tubular guides such as small pipes 11, are inserted and secured, these tubes being extended around the end wall 8 of said pan section and secured thereon.

Upon the pan section $5^a$ which slides in the section 5, wire slide rods 12 are mounted, preferably by flattening said rods where they have contact with the end wall $8^a$ on the pan section $5^a$, and securing said flattened portions $12^a$ upon said end wall by means of rivets e, as shown in Figs. 1 and 2. There are two of the wire slide rods 12 on each side wall $7^a$ of the pan section $5^a$, and these rods are so spaced in pairs as to be adapted for free slidable engagement within the open ends of the tubular guides 11.

A plurality of clip plates 13 are secured longitudinally on the outer surface of the bottom wall 6 of the pan section 5, and upon the end wall $8^a$ of the other pan section $5^a$ corresponding slide rods 14 are secured by one end, said rods working in tubular formations d in the clip plates 13.

It will be seen that the slide rods 12 and 14 stiffen the pan sections 5, $5^a$ and render the pan very rigid at any point of sliding adjustment had by the pan sections, and cause the free ends of the sides 7 on the section $5^a$, to closely bear on the inner surfaces of the corresponding side walls of the other section 5, so that there will be no leakage between the joint, and even thin batter for a cake will not escape where the pan sections have lapped connection.

Having thus described my invention, I claim as new and desire to secure by Letters Patent:

1. A pan comprising two half sections, one slidable within the other, each section having one end wall, two longitudinally extended guide rods supported from the end wall of one section and spaced apart on each side wall thereof, a corresponding number of bracket plates on the other half section and longitudinally disposed guide tubes mounted on the bracket plates, said tubes receiving the guide rods when the pan sections are slid upon each other.

2. A pan, comprising two half sections, one slidable in the other, means for holding the upper side edges of the pan sections loosely connected, means for slidably interlocking the lower corners at the sides of the pan sections, and a guide-rod on one pan section at the lower side of its bottom, slidable in clip-plates on the bottom of the other pan section.

In testimony whereof I have signed my name to this specification in the presence of two subscribing witnesses.

JENMATSU MIO.

Witnesses:
J. G. Dawson,
E. W. Smith.